United States Patent
Smith et al.

(10) Patent No.: US 10,808,695 B2
(45) Date of Patent: Oct. 20, 2020

(54) REDUCTION OF CAVITATION IN FUEL PUMPS

(71) Applicant: Hamilton Sundstrand Corporation, Charlotte, NC (US)

(72) Inventors: Blair A. Smith, South Windsor, CT (US); Steven Poteet, Hamden, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 368 days.

(21) Appl. No.: 15/837,044

(22) Filed: Dec. 11, 2017

(65) Prior Publication Data
US 2019/0178244 A1 Jun. 13, 2019

(51) Int. Cl.
| F04C 2/08 | (2006.01) |
| F02C 7/236 | (2006.01) |
| F04C 2/18 | (2006.01) |
| B64D 37/04 | (2006.01) |

(52) U.S. Cl.
CPC .............. *F04C 2/084* (2013.01); *F02C 7/236* (2013.01); *F04C 2/18* (2013.01); *F04C 2210/203* (2013.01); *F05B 2210/30* (2013.01); *F05B 2260/95* (2013.01); *F05B 2280/2005* (2013.01); *F05B 2280/20043* (2013.01); *F05B 2280/20083* (2013.01); *F05C 2203/08* (2013.01); *F05C 2203/0843* (2013.01); *F05C 2203/0895* (2013.01)

(58) Field of Classification Search
CPC . F04C 2/084; F04C 2/18; F02C 7/236; B64D 37/04
USPC ................................................ 74/445, 572.11
See application file for complete search history.

(56) References Cited

U.S. PATENT DOCUMENTS

| 5,549,667 | A  |    | 8/1996  | Davidson |
| 6,279,454 | B1 |    | 8/2001  | Nishioka et al. |
| 6,612,821 | B1 | *  | 9/2003  | Kuijpers .................. F04C 2/14 418/152 |
| 6,659,065 | B1 | *  | 12/2003 | Renegar .................... F01C 1/44 123/227 |
| 7,591,637 | B2 |    | 9/2009  | Muehlhausen et al. |
| 8,025,157 | B2 |    | 9/2011  | Takita et al. |
| 2009/0087492 | A1 |    | 4/2009  | Johnson et al. |
| 2010/0239205 | A1 | *  | 9/2010  | Ohki ....................... C21D 1/06 384/622 |
| 2016/0023774 | A1 | *  | 1/2016  | Ni ............................ B64D 37/04 244/135 R |

FOREIGN PATENT DOCUMENTS

| DE | 759960 C | 9/1953 |
| DE | 9405502 U1 | 7/1994 |

(Continued)

OTHER PUBLICATIONS

European Search Report for Application No. 18211606.1 dated Apr. 30, 2019, 7 pages.

*Primary Examiner* — Deming Wan
(74) *Attorney, Agent, or Firm* — Cantor Colburn LLP

(57) ABSTRACT

A fluid gear pump gear arranged to rotate about a first axis includes a concentrically disposed first hub portion and a plurality of first teeth radially projecting and circumferentially spaced about the first hub portion, the first hub portion and the first teeth being formed of a ceramic material. The gear also includes a first shaft on which the first hub portion is carried.

9 Claims, 5 Drawing Sheets

(56) References Cited

FOREIGN PATENT DOCUMENTS

| JP | 2592874 | B2 | 7/1989 |
| JP | 2011121822 | A | 6/2011 |
| WO | 2005056879 | A1 | 6/2005 |
| WO | 2017127629 | A1 | 7/2017 |

\* cited by examiner

REDUCTION OF CAVITATION IN FUEL PUMPS

BACKGROUND

The subject matter disclosed herein generally relates to the field of fuel pumps, and more particularly to an apparatus and method for reducing cavitation in fuel pumps.

Aircraft gas turbine engines receive pressurized fuel from different kinds of fuel pumps including gear-type fuel pumps. The gear pump typically performs over a wide operational speed range while providing needed fuel flows and pressures for various engine performance functions.

Gear pumps often comprise two coupled gears of similar configuration and size that mesh with each other inside an enclosed gear housing. A drive gear may be connected rigidly to a drive shaft. As the drive gear rotates, it meshes with a driven gear thus rotating the driven gear. As the gears rotate within the housing, fluid is transferred from an inlet to an outlet of the gear pump. Typically, the drive gear carries the full load of the gear pump drive or input shaft. The two gears may operate at high loads and high pressures, which may stress the gear teeth.

For given gear sizes the volume of fluid pumped through the gear pump may partially depend on the geometry of the tooth (e.g., depth, profile, etc.), the tooth count, and the width of the gear. Most gear pumps have gears with about ten to sixteen teeth. As the gears rotate, individual parcels of fluid are released between the teeth to the outlet. A common problem with more traditional gear pumps operating at high rotational speeds is cavitation erosion of the surfaces of the gear teeth and bearings. Cavitation erosion results in pitting of surfaces of the gear teeth that may eventually result in degraded pump volumetric capacity and affect pump operability and durability.

BRIEF SUMMARY

According to one embodiment, a fluid gear pump that includes a first gear constructed and arranged to rotate about a first axis is disclosed. The first gear includes a concentrically disposed first hub portion and a plurality of first teeth radially projecting and circumferentially spaced about the first hub portion, the first hub portion and the first teeth being formed of a ceramic material. The pump also includes a second gear operably coupled to the first gear for rotation about a second axis, the second gear including a concentrically disposed second hub portion and a plurality of second teeth radially projecting and circumferentially spaced about the second hub portion, wherein at a time in operation the plurality of first teeth and the plurality of second teeth contact at first contact point and a second contact point to create a backlash volume interposed between the first contact point and the second contact point. The pump further includes a first bearing abutting and coaxial to the first hub portion and a second bearing abutting and coaxial to the second hub portion.

In a pump of any prior embodiment, the first gear is formed of a silicon-aluminum-oxygen-nitrogen (SiAlON) ceramic.

In a pump of any prior embodiment, the second gear is formed of a SiAlON ceramic.

In a pump of any prior embodiment, the first gear is formed of partially stabilized zirconia.

In a pump of any prior embodiment, wherein partially stabilized zirconia is doped with yttrium.

In a pump of any prior embodiment, the pump also includes a first shaft on which the first gear is carried, a second shaft on which the second gear is carried and the second gear is formed of a ceramic material.

In a pump of any prior embodiment, the pump also includes a third gear carried on the second shaft.

In a pump of any prior embodiment, one or more of the first, second and third gear are formed of a SiAlON ceramic.

In a pump of any prior embodiment, one or more of the first, second and third gears are formed of partially stabilized zirconia.

In one embodiment, a method of reducing cavitation during fluid gear pump operation is disclosed. The method includes: rotating a first gear around first axis, the first gear including a concentrically disposed first hub portion and a plurality of first teeth radially projecting and circumferentially spaced about the first hub portion, wherein the first teeth are formed of a ceramic material; rotating a second gear coupled to the first gear about a second axis, the second gear including a concentrically disposed second hub portion and a plurality of second teeth radially projecting and circumferentially spaced about the second hub portion, wherein the plurality of first teeth engage the plurality of second teeth; and transferring fluid from a low pressure side to a high pressure side when the first gear is rotating and the second gear is rotating.

In a method of any prior embodiment, the first gear is formed of a silicon-aluminum-oxygen-nitrogen (SiAlON) ceramic.

In a method of any prior embodiment, the second gear is formed of a SiAlON ceramic.

In a method of any prior embodiment, the first gear is formed of partially stabilized zirconia.

In a method of any prior embodiment, the partially stabilized zirconia is doped with yttrium.

In one embodiment a fluid gear pump gear arranged to rotate about a first axis is disclosed. The fluid gear pump gear includes a concentrically disposed first hub portion and a plurality of first teeth radially projecting and circumferentially spaced about the first hub portion, the first hub portion and the first teeth being formed of a ceramic material, and a first shaft on which the first hub portion is carried.

In a fluid gear pump gear of any prior embodiment, the first gear is formed of a silicon-aluminum-oxygen-nitrogen (SiAlON) ceramic.

In a fluid gear pump gear of any prior embodiment, the first gear is formed of partially stabilized zirconia.

In a fluid gear pump gear of any prior embodiment, partially stabilized zirconia is doped with yttrium.

In a fluid gear pump gear of any prior embodiment, the gear also includes a second gear carried on the first shaft.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Various embodiments of the present disclosure are related to the reduction of fluid cavitation within gear pumps. Aircraft engine high pressure fuel pumps typically use a pair of involute gears to generate fuel pressure for the burner injectors. These gears are enclosed in a housing within which they are supported by bearings. In the vicinity of the gear meshing region these bearings form a bridgeland that separates the high and low pressure regions and maintains high pump efficiency. A pump of this description experiences significant pressure oscillations that may lead to the formation and subsequent collapse of cavitation bubbles that may cause material damage. The gears may be especially susceptible to cavitation damage and that results in a deterioration of pump performance and can significantly reduce the useable life of these components. To address these issues a gear shaft that includes gear teeth formed of a ceramic material. Utilization of a ceramic for the gears generally and gear teeth in particular may have the technical effect of reducing cavitation on the gear teeth. Two non-limiting examples of such ceramic materials include, but are not limited to, partially stabilized zirconia and silicon-aluminum-oxygen-nitrogen (SiAlON) ceramics. In one embodiment the stabilized zirconia may be doped with yttrium. In some embodiments, only a portion of gear tooth may be formed of a ceramic and the rest formed of another material, such as stainless steel. In one embodiment, the gear teeth are formed of solid pieces of ceramic.

Figure 1:
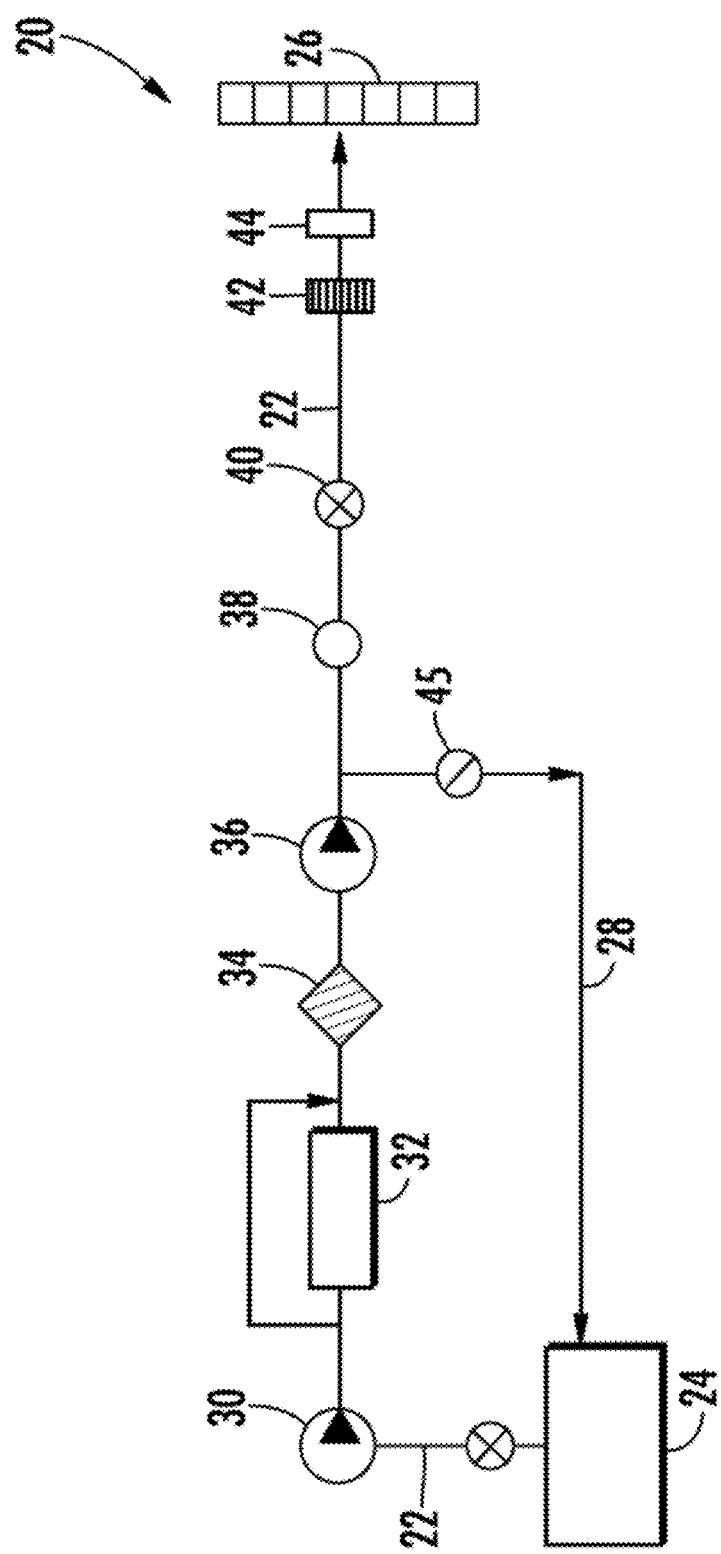
FIG. 1 illustrates a schematic of an aircraft fuel system as one, non-limiting, example of an application of a gear pump of the present disclosure.

Referring to FIG. 1, one embodiment of a fuel system 20 of the present disclosure is illustrated. The fuel system 20 may be an aircraft fuel system and may include a fuel supply line 22 that may flow liquid fuel from a fuel tank 24 to fuel nozzles 26 of an engine (not shown). A fuel bypass line 28 may be arranged to divert fuel from the supply line 22 and back to the fuel tank 24. Various fuel system components may interpose the fuel supply line 22 and may include a low pressure fuel pump 30, a heat exchanger 32, a fuel filter 34, a high pressure fuel pump 36, a metering valve 38, a high pressure fuel shutoff valve 40, a screen 42, a fuel flow sensor 44, and a fuel tank shutoff valve 45. The low pressure fuel pump 30 may be located downstream of the fuel tank 24. The heat exchanger 32 may be located downstream of the low pressure fuel pump 30. The fuel filter 34 may be located downstream of the heat exchanger 32. The high pressure fuel pump 36 may be located downstream of the fuel filter 34 and upstream of the fuel bypass line 28. The metering valve 38 may be located downstream from the bypass line 28. The high pressure fuel shutoff valve 40 may be located downstream from the bypass line 28. The screen 42 may be located downstream from the high pressure fuel shutoff valve 40, and the fuel flow sensor 44 may be located downstream from the screen 42. It is further contemplated and understood that other component configurations of a fuel system are applicable and may further include additional sensors, valves and other components.

The heat exchanger 32 may be adapted to use the flowing fuel as a heat sink to cool other liquids flowing from any variety of auxiliary systems of an aircraft and/or the engine. For example, the heat exchanger 32 may transfer heat from an oil and to the fuel. The oil may be used to lubricate any variety of auxiliary components including, for example, a gear box (not shown) of the engine. Such a transfer of heat may elevate the temperature of the fuel which may make the high pressure fuel pump 36 more prone to cavitation.

Figure 2:
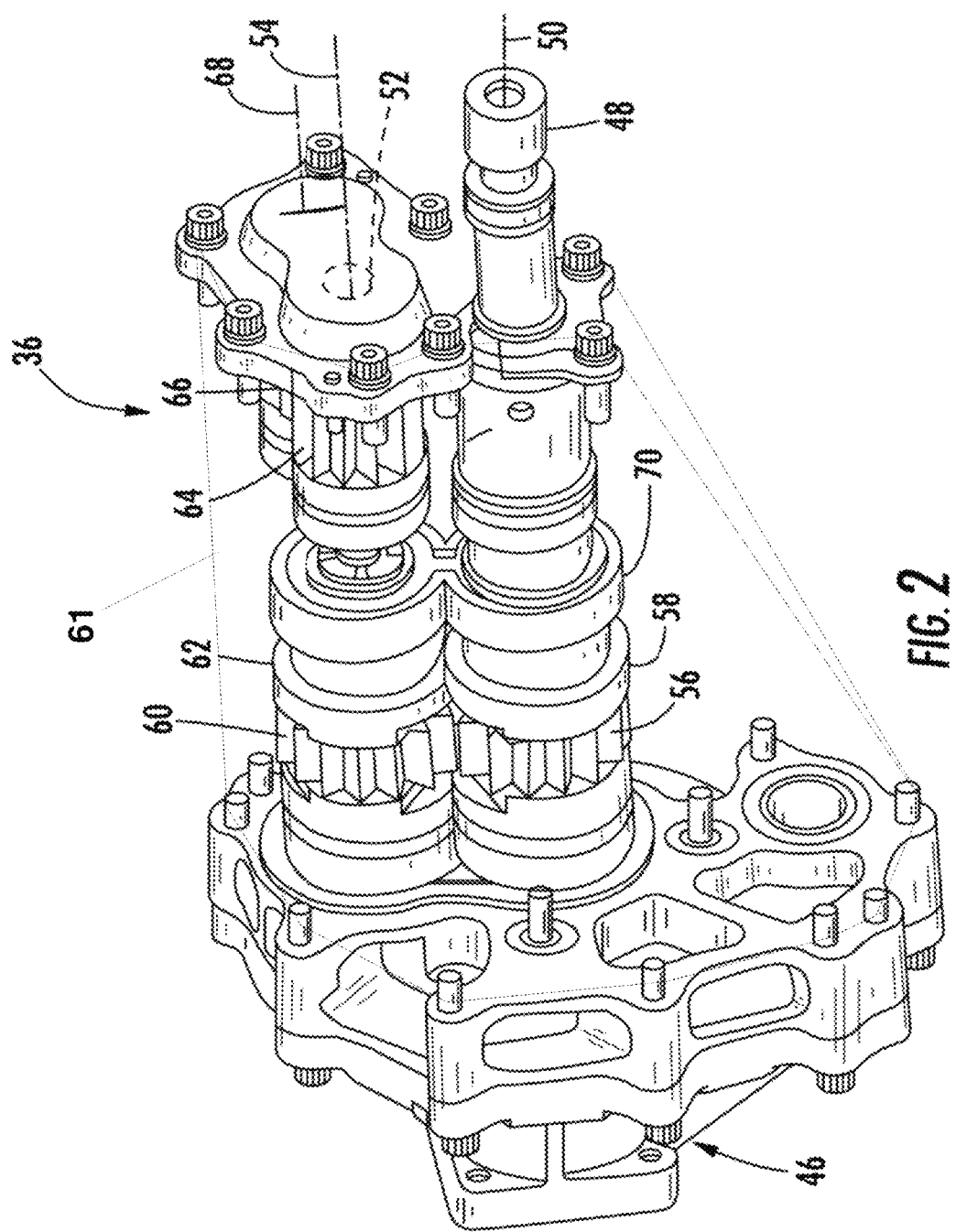
FIG. 2 illustrates a perspective view of the gear pump with a housing removed to show internal detail.
Figure 3:
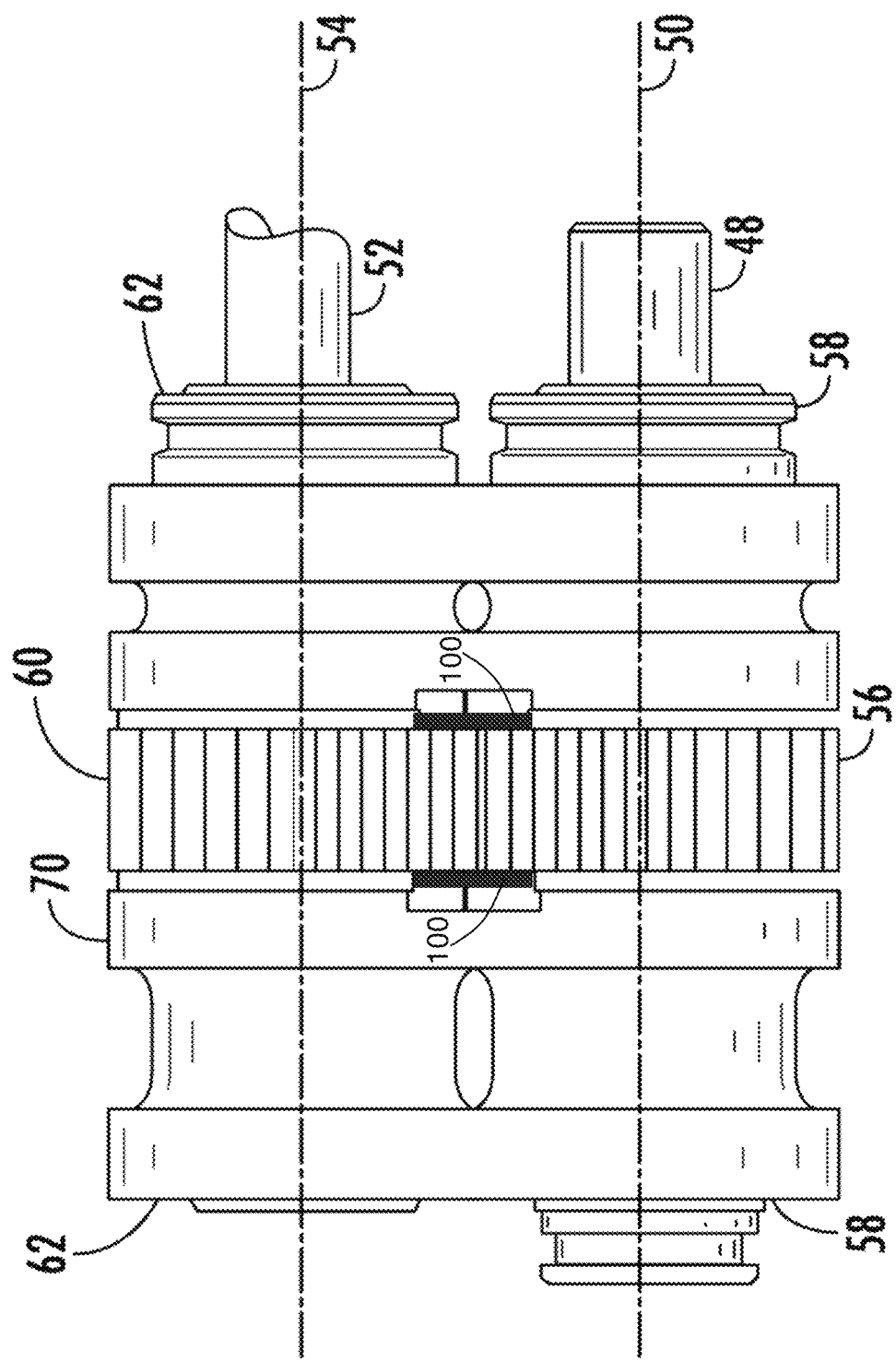
FIG. 3 shows a side view of the drive and driven gears of the gear pump.

Referring to FIGS. 2 and 3, one non-limiting example of the high pressure fuel pump 36 is illustrated as a gear pump with a housing removed to show internal detail. The housing is shown, generally, by dashed line 61.

The gear pump 36 may be a dual stage pump and may include a fuel centrifugal boost pump housing 46, an input drive shaft 48 constructed for rotation about a first axis 50, a coupling shaft 52 constructed for rotation about a second axis 54, a drive gear 56 with associated bearings 58, a driven gear 60 with associated bearings 62, a motive drive gear 64 and a motive driven gear 66 configured for rotation about a third axis 68. The axis 50, 54, 68 may be substantially parallel to one-another. The drive shaft 48 may attach to an engine gear box (not shown). The drive gear 56 is engaged and concentrically disposed about the drive shaft 48. The driven gear 60 and motive drive gear 64 are engaged and concentrically disposed about the coupling shaft 52.

The drive and driven gears 56, 60 are rotationally coupled to one another for the pumping (i.e., displacement) of fuel as a first stage, and the motive drive gear 64 and motive driven gear 66 are rotationally coupled to one another for the continued pumping of the fuel as a second stage.

In one embodiment, some or all of at least one of the drive gear 56 and the driven gear 60 is formed of a ceramic material. In one embodiment, all of the one or both of the drive or driven gears 56, 60 are formed of a ceramic material. In another, only the teeth are formed of ceramic and in yet another, only a portion of one or more of the teeth is formed of a ceramic. As discussed above, examples of suitable ceramics includes SiAlON ceramics and stabilized zirconia that may be doped with yttrium. The same may also apply to the motive drive and motive driven gears 64, 66.

It is further contemplated and understood that many other types of gear pumps may be applicable to the present disclosure. For example, the gear pump may be a single stage gear pump, and/or the drive shaft 48 may be attached to any other device capable of rotating the drive shaft 48 (e.g., electric motor).

The bearings 58, 62 may be inserted into a common carrier 70 that generally resembles a figure eight. A gear bearing face geometry, known in the art as a bridgeland 100 may be sculpted to minimize cavitation and pressure ripple that may deteriorate the integrity of the pump components, discussed further below. The bridgeland 100 separates a low pressure side and a high pressure side of the pump.

In operation, the gear pump 36 is capable of providing fuel at a wide range of fuel volume/quantity and pressures for various engine performance functions. The engine gearbox provides rotational power to the drive shaft 48 which, in-turn, rotates the connected drive gear 56. The drive gear 56 then drives (i.e., rotates) the driven gear 60 that rotates the coupling shaft 52. Rotation of the coupling shaft 52 rotates the motive drive gear 64 that, in-turn, rotates the motive driven gear 66.

Figure 4:
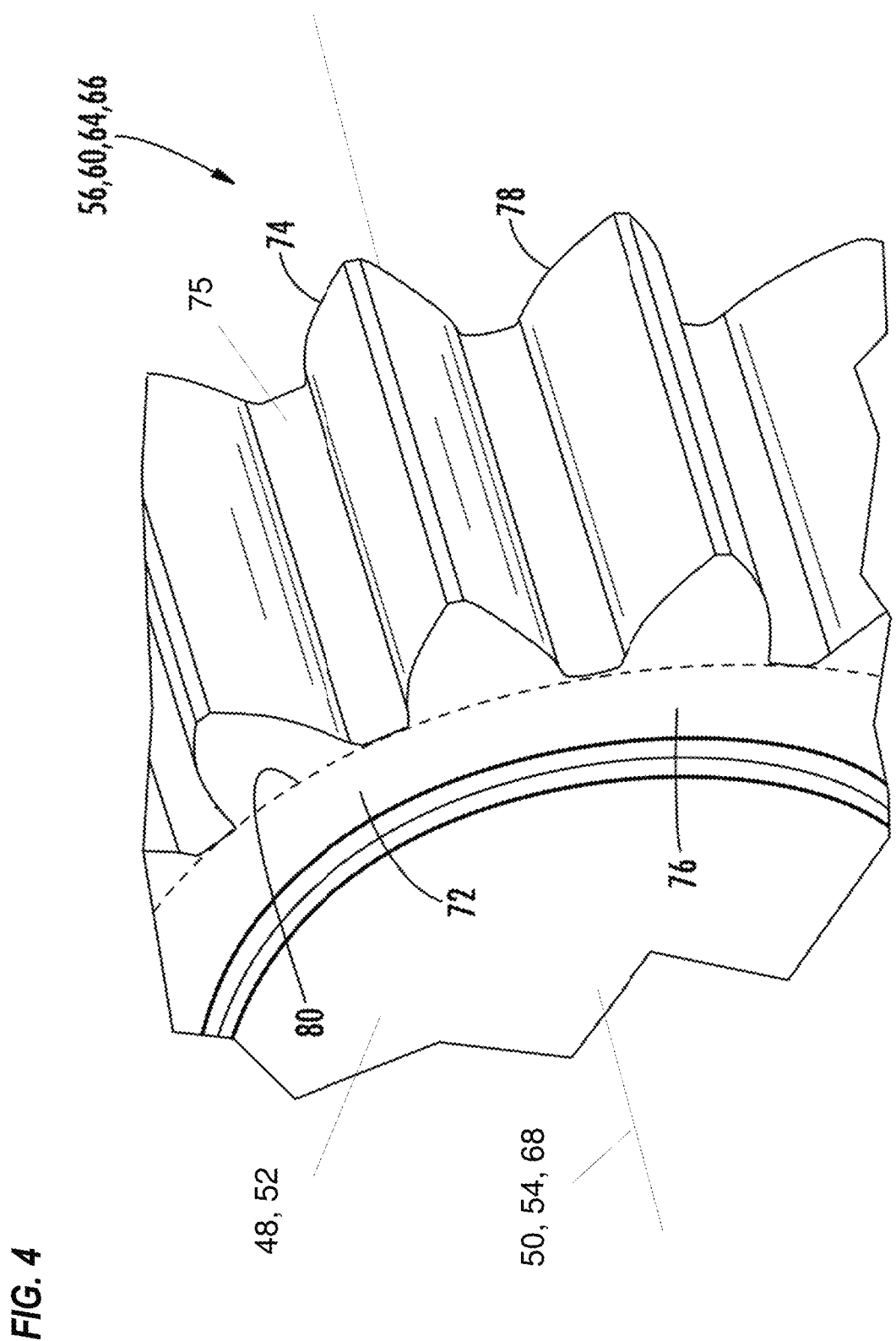
FIG. 4 is a perspective view of a portion of a gear according to one or more embodiments.

FIG. 4 shows a perspective view of a gear. The gear can be any of the drive gear 56, the driven gear 60, the motive drive gear 64 and the motive driven gear 66. Referring to FIG. 4, each of the gears 56, 60, 64, 66 may include a hub portion 72 and a plurality of teeth 74 that may both span axially between two opposite facing sidewalls 76, 78. Each sidewall 76, 78 may lay within respective imaginary planes that are substantially parallel to one-another. The hub portion 72 may be disc-like and projects radially outward from the respective shafts 48, 52 and/or axis 50, 54, 68 to a circumferentially continuous face 80 generally carried by the hub portion 72. The face 80 may generally be cylindrical. The plurality of teeth 74 project radially outward from the face 80 of the hub portion 72 and are circumferentially spaced about the hub portion 72. The gears 56, 60, 64, 66 may be spur gears, helical gears or other types of gears with meshing teeth, and/or combinations thereof.

The hub portion 72 can be formed of a ceramic material in one embodiment. In such an embodiment, the spaces between the teeth 74 (shown by reference numeral 75) may be formed of ceramic. The ceramic can include any of the ceramics disclosed herein or other suitable ceramics. In another embodiment, the hub portion 72 is formed of metal, such as steel or stainless steel and the teeth 74 are formed of ceramic either attached to the hub portion 72 or that pass at least partially through the hub portion 72.

Figure 5:
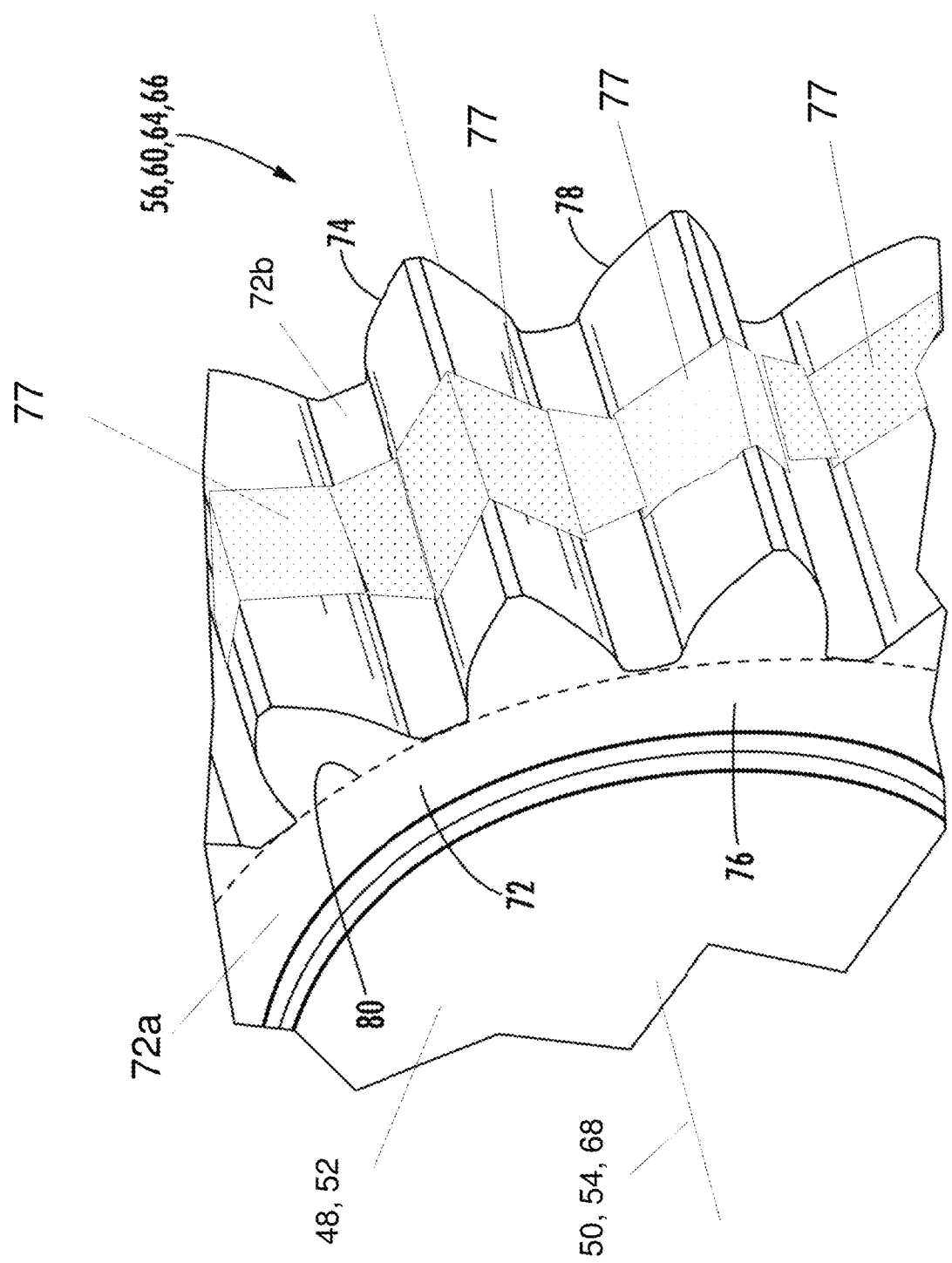
FIG. 5 is a perspective view of a portion of gear according to another embodiment.

FIG. 5 shows a perspective view of another embodiment of a gear. The gear can be any of the drive gear 56, the driven gear 60, the motive drive gear 64 and the motive driven gear 66. Each of the gears 56, 60, 64, 66 may include a hub portion 72 and a plurality of teeth 74 that may both span axially between two opposite facing sidewalls 76, 78. The hub portion 72 may be disc-like and projects radially outward from the respective shafts 48, 52 and/or axis 50, 54, 68 to a circumferentially continuous face 80 generally carried by the hub portion 72. The face 80 may generally be cylindrical. The plurality of teeth 74 project radially outward from the face 80 of the hub portion 72 and are circumferentially spaced about the hub portion 72. As in prior embodiments, the gears 56, 60, 64, 66 may be spur gears, helical gears or other types of gears with meshing teeth, and/or combinations thereof.

In one embodiment, the hub portion 72 is formed of metal, such as steel or stainless steel and a portion of the teeth 74 are also formed of a metal. A portion of the teeth 74/hub can be formed of ceramic as indicated by way of example in regions 77.

In such an example, the hub can include two portions (72a/72b) separated by a ring shaped in the same manner and having teeth formed of ceramic and sandwiched between the two portions. Construction of such an assembly can be achieved by gluing the pieces together or by any other effective construction method.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of reducing cavitation during fluid gear pump operation, the method comprising:
    rotating a first gear around first axis, the first gear including a concentrically disposed first hub portion and a plurality of first teeth radially projecting and circumferentially spaced about the first hub portion, wherein the first teeth are formed of a ceramic material, wherein the first hub and the first teeth are formed of a silicon-aluminum-oxygen-nitrogen (SiAlON) ceramic or partially stabilized zirconia;
    rotating a second gear coupled to the first gear about a second axis, the second gear including a concentrically disposed second hub portion and a plurality of second teeth radially projecting and circumferentially spaced about the second hub portion, wherein the plurality of first teeth engage the plurality of second teeth; and
    transferring fluid from a low pressure side to a high pressure side when the first gear is rotating and the second gear is rotating.

2. A fluid gear pump gear arranged to rotate about a first axis, the first gear pump gear comprising:
    a concentrically disposed first hub portion and a plurality of first teeth radially projecting and circumferentially spaced about the first hub portion, the first hub portion and the first teeth being formed of a ceramic material, wherein the first hub and the first teeth are formed of a silicon-aluminum-oxygen-nitrogen (SiAlON) ceramic or partially stabilized zirconia; and
    a first shaft on which the first hub portion is carried.

3. The fluid gear pump as set forth in claim 2, further comprising a second gear carried on the first shaft.

4. A fluid gear pump comprising:
    a first gear constructed and arranged to rotate about a first axis, the first gear including a concentrically disposed first hub portion and a plurality of first teeth radially projecting and circumferentially spaced about the first hub portion, the first hub portion and the first teeth being formed of a ceramic material;
    a second gear operably coupled to the first gear for rotation about a second axis, the second gear including a concentrically disposed second hub portion and a plurality of second teeth radially projecting and circumferentially spaced about the second hub portion;
    a first bearing abutting and coaxial to the first hub portion; and
    a second bearing abutting and coaxial to the second hub portion wherein the first hub and the first teeth are formed of a silicon-aluminum-oxygen-nitrogen (SiAlON) ceramic or partially stabilized zirconia.

5. The fluid gear pump as set forth in claim 4, wherein the second gear is formed of a SiAlON ceramic.

6. The fluid gear pump set forth in claim 4, further comprising:
a first shaft on which the first gear is carried; and
a second shaft on which the second gear is carried;
wherein the second gear is formed of a ceramic material.

7. The fluid gear pump as set forth in claim 6, further comprising a third gear carried on the second shaft.

8. The fluid gear pump as set forth in claim 7, wherein one or more of the second and third gears are formed of a SiAlON ceramic.

9. The fluid gear pump as set forth in claim 8, wherein one or more of the second and third gears are formed of partially stabilized zirconia.

* * * * *